United States Patent [19]

Satake et al.

[11] Patent Number: 5,354,514
[45] Date of Patent: Oct. 11, 1994

[54] NEAR INFRARED ABSORBING COMPOSITION AND MATERIAL AND PRODUCT CONTAINING SAME

[75] Inventors: Toshimi Satake; Tomoaki Nagai, both of Tokyo, Japan

[73] Assignee: Jujo Paper Co., Ltd., Tokyo, Japan

[21] Appl. No.: 887,606

[22] Filed: May 22, 1992

Related U.S. Application Data

[63] Continuation of Ser. No. 383,176, Jul. 21, 1989, abandoned.

[30] Foreign Application Priority Data

Jul. 22, 1988 [JP] Japan .................... 63-183329

[51] Int. Cl.$^5$ .............................................. F21V 9/04
[52] U.S. Cl. ................................................. 252/587
[58] Field of Search ............... 252/582, 587, 588, 589; 430/495, 944

[56] References Cited

U.S. PATENT DOCUMENTS

5,236,633 8/1993 Satake et al. .................... 252/587

OTHER PUBLICATIONS

Podolesov, B. D., Chemical Abstracts 106:4944R, 1987.
DeVillanova et al., Journal of Inorganic and Nuclear Chemistry, 1981, No. 11, pp. 2749–2752.
Satchell et al., Journal of the Chemical Society-Chemical Communications, 1975, pp. 50–51.
Fuller et al., Australian Journal of Chemistry, 1985 vol. 38, pp. 865–878.

*Primary Examiner*—Philip Tucker
*Attorney, Agent, or Firm*—Sherman and Shalloway

[57] ABSTRACT

Near infrared absorbing composition and material comprising a specific thioamide compound and a copper compound and/or a lead compound. The composition and material of this invention provide an uniform absorption over a near IR-region without decreasing other properties.

3 Claims, 2 Drawing Sheets

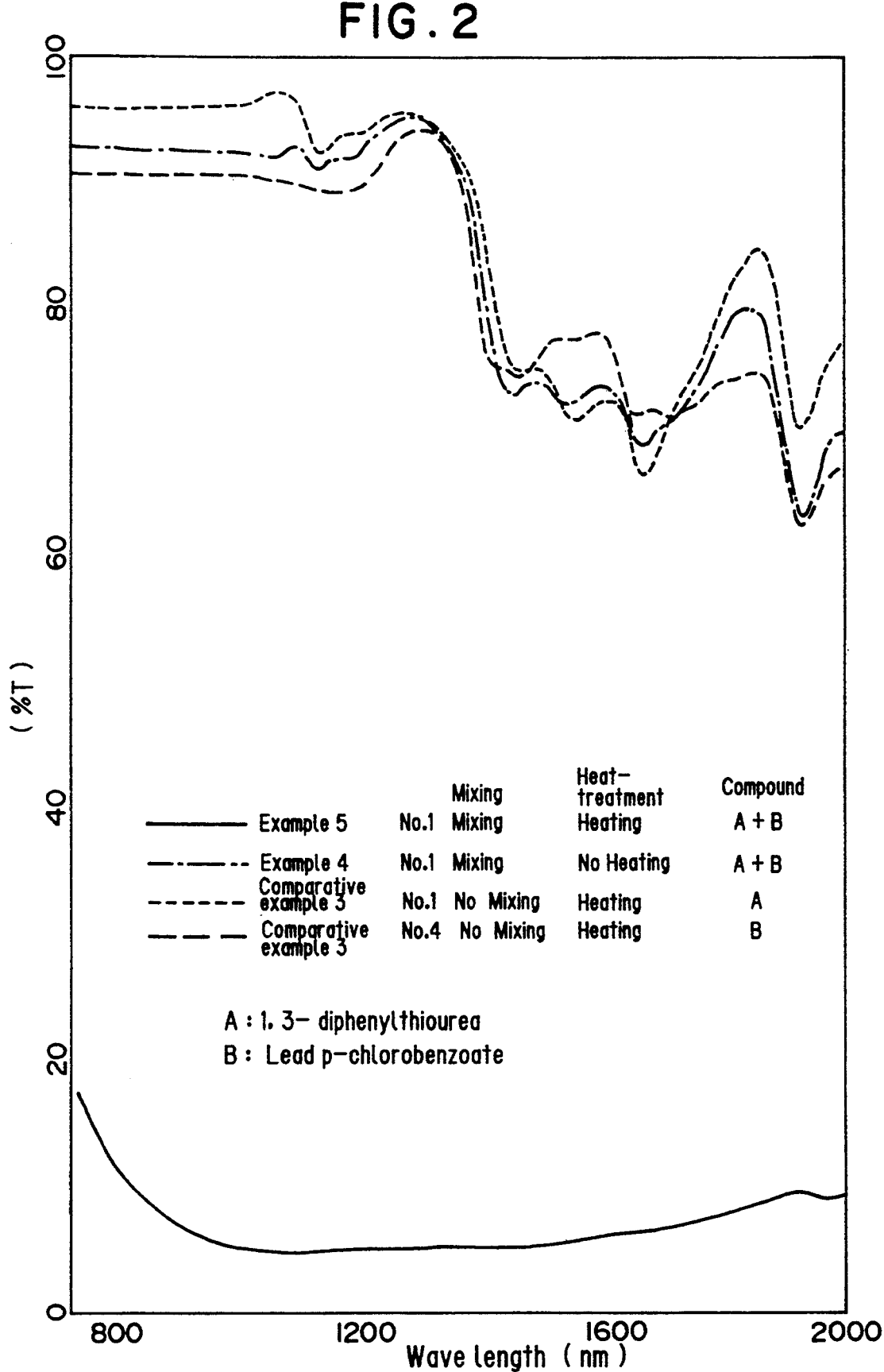

NEAR INFRARED ABSORBING COMPOSITION AND MATERIAL AND PRODUCT CONTAINING SAME

This application is a continuation of application Ser. No. 07/383,176, filed Jul. 21, 1989, now abandoned.

BACKGROUND OF THE INVENTION

1. Field of the Invention

This invention relates to a near infrared absorbing composition (hereinafter referred to as a near IR-absorbing composition) comprising both thioamide compound and at least one compound selected from a member consisting of copper compound and lead compound, a near infrared absorbing material (hereinafter referred to as a near IR-absorbing material) comprising both compounds, and a product containing said composition or said material.

2. Prior Art

Recently, near IR-absorbing materials have been researched and developed. They have found a wide use, including light-sensitive materials using a semiconductor laser ray having a near IR-wave length range, etc. as a light source; information-recording materials such as an optical recording disk; optical materials such as IR-cut filter, IR-cut film; light-heat-converting record material used together with a heat-sensitive material.

As hitherto developed near IR-absorbing materials, there are disclosed a chrome-cobalt complex in Japanese Patent Publication No. 60-42269, a thiolnickel complex in Japanese Laid-Open Patent Application No. 60-21294, an anthraquinone derivative in Japanese Laid-Open Patent Application No. 61-115958, a novel squarylium compound having a maximum absorption in a wave length range of 700–800 nm in Japanese Laid-Open Patent Application No. 61-218551.

Further, there are described a nitroso compound, metal complex thereof, a polymethine dye (cyanine dye), a cobalt-, platinum-, or palladium-complex of thiol, Phthalocyanine dye, triarylmethane dye, immonium dye, diimmonium dye, a naphthoquinone dye, and the like in "Near IR-absorbing dyestuff" (Kagakukogyo, 43, May 1986).

Among the conventional near IR-absorbing materials, the organic materials have the defects that the durability is inferior and the original abilities deteriorate with the change of condition or the lapse of time. On the contrary, the complex-base materials, which exhibit a good durability, have defects that they are strongly colored owing to the absorption of both visible range and near infrared range, so that their uses are limited. Both materials indicate an absorption peak at a particular wave length and have little absorbency in the range of outside the particular wave length. For a recording material in which one of both materials is used and a laser ray of near IR-wave length, for example, is applied as a light source, it is required that the wave length of laser agrees with an absorption peak of one material. Since both the wave length of laser and the absorption wave length of the near IR-absorbing material are limited, the combination in which the wave length of laser agrees with the absorption peak of the near IR-absorbing material is extremely restricted. It is said that this combination hardly exists taking the absorbency, durability, coloring, costs, etc. into consideration. This use is extremely limited.

SUMMARY OF THE INVENTION

It is the general object of this invention to provide a near IR-absorbing material which has an uniform absorption in an entire near IR-region of 700–2000 nm, a slight color, and an excellent durability.

It is the second object of this invention to provide a near IR-absorbing composition, from which the near IR-absorbing material is easily produced.

It is the third object of this invention to provide a product comprising the near IR-absorbing material or the near IR-absorbing composition.

The above objects have been achieved as follows. The near IR-absorbing composition of this invention comprises at least one thioamide compound of the following general formula (I) and at least one compound selected from a member consisting of copper compound and lead compound.

Wherein $R_1$ and $R_2$ are same or different, and represent a hydrogen atom, an alkyl group, a cycloalkyl group, an aryl group, an aralkyl group, an alkenyl group, a monovalent group selected from a member consisting of penta and hexa heterocyclic rests, or $R_2$ represents an alkoxy group; in addition each group may have a substituent, and $R_1$ and $R_2$ taken together with each other may form a ring.

The near IR-absorbing material of this invention comprises a reaction-substance obtained by heating the composition of this invention.

The near IR-absorbing product of this invention comprises the composition or material of this invention.

BRIEF DESCRIPTION OF THE DRAWING

FIG. 2 shows the near IR-reflexion spectra for the comparison of a separate heating, a mixing, and a combined heating of N-phenylthiobenzamide and lead p-chlorobenzoate.

DETAILED DESCRIPTION OF THE INVENTION

Figure 1:
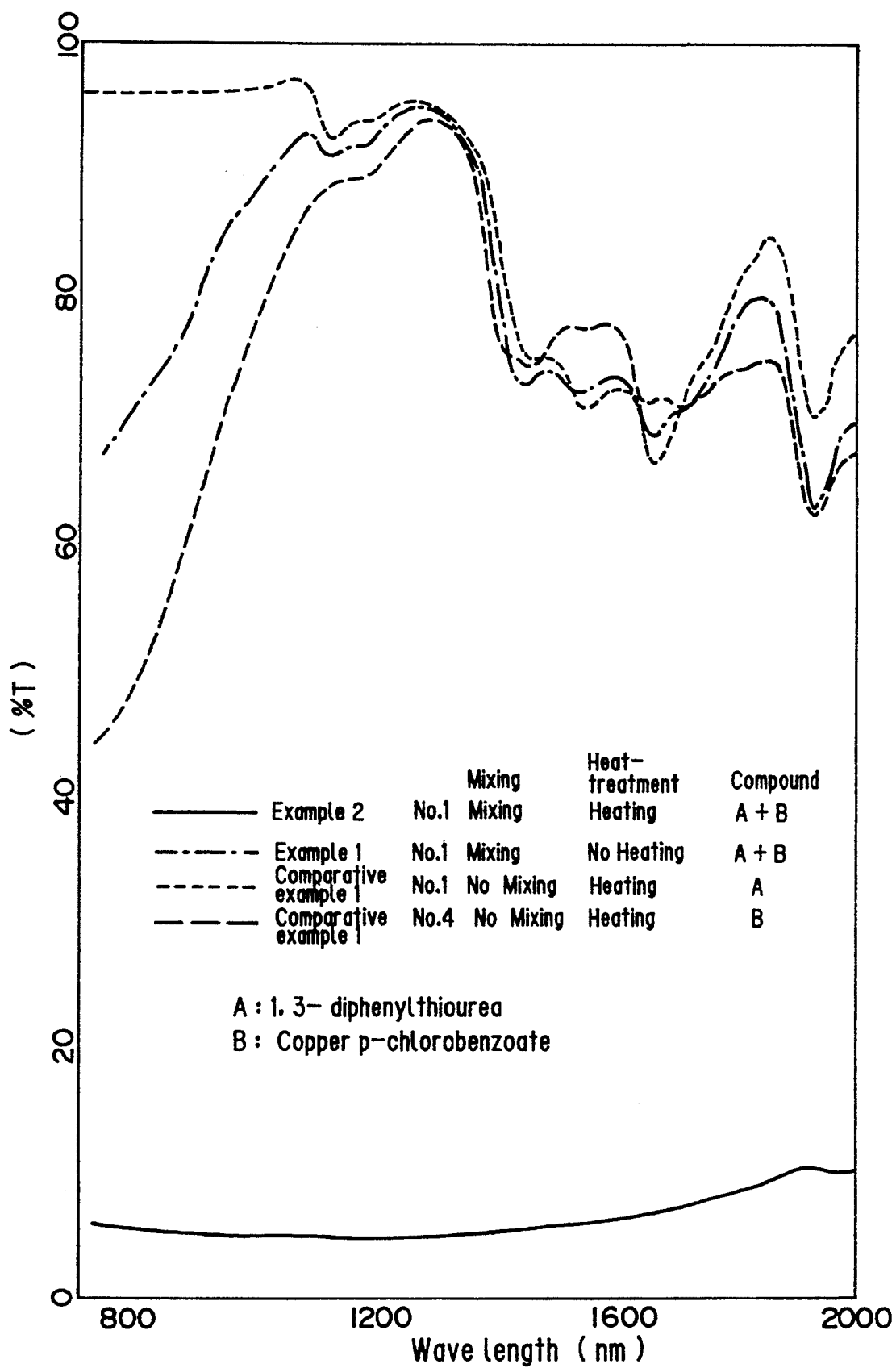
FIG. 1 shows the near IR-reflexion spectra for the comparison of a separate heating, a mixing, and a combined heating, of N-phenylthiobenzamide and copper p-chlorobenzoate.

The thioamide compounds of the general formula (I) used in this invention are not particularly limited and include, for example, the following compounds:

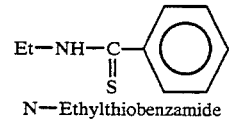

N—Ethylthiobenzamide

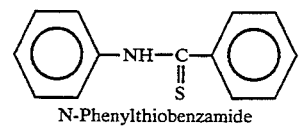

N-Phenylthiobenzamide

-continued

Et—NH—C(=S)—Et
N-Ethylthioethylamide

Cl—C₆H₄—C(=S)—NH—Et
N-Ethylthio-p-chlorobenzamide

Ph—C(=S)—NH—CH₂—CH=CH₂
N-Propylene thiobenzamide

Et—NH—C(=S)—C₁₈H₃₇
N-Ethylthiostearylamide (thiazol-2-yl)—NH—C(=S)—Ph
N-1-(2-thiazolyl)thiobenzamide C₁₈H₃₇—NH—C(=S)—C₁₈H₃₇
N-Stearyl thiostearylamide C₂₂H₄₅—NH—C(=S)—C₂₂H₄₅
N-Behenyl thiobehenylamide CH₃—C(=S)—NH₂
Thioacetamide Br—C₆H₄—C(=S)—NH—Ph
N-Phenyl-thio-p-bromobenzamide (thiophen-2-yl)—NH—C(=S)—Ph
N-1-(2-thiophenyl)thiobenzamide CH₃—C(=S)—NH—C₂₂H₄₅
N-Behenyl thioacetamide Ph—C(=S)—NH—C₆H₄—NH₂
N-p-Aminophenyl thiobenzamide Ph—C(=S)—NH—C₆H₄—NO₂
N-p-Nitrophenyl thiobenzamide -continued Ph—C(=S)—NH—C₆H₄—OH
N-p-Hydroxyphenyl thiobenzamide (3-Cl-C₆H₄)—NH—C(=S)—Ph
N-m-Chlorophenyl thiobenzamide

CH₂—NH
  |    \
CH₂—CH₂   C=S

NH₂—C(=S)—(pyridin-3-yl)
Thionictinamide

Ph—NH—C(=S)—CH₃
Thioacetanilide

Ph—NH—C(=S)—OC₂H₅
O-Ethyl-N-phenyl(thiocarbamate)

Ph—C(=S)—NH₂
Thiobenzamide (3-O₂N-C₆H₄)—C(=S)—NH₂
Thio-m-nitrobenzamide

O₂N—C₆H₄—C(=S)—NH₂
Thio-p-nitrobenzamide

H₂N—C₆H₄—C(=S)—NH₂
Thio-p-aminobenzamide

H₃C—C(=S)—NH—CH₃
N-Methyl thioacetamide

-continued

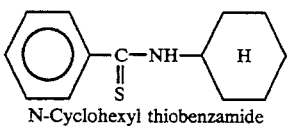
N-Cyclohexyl thiobenzamide

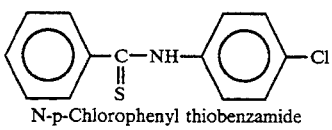
N-p-Chlorophenyl thiobenzamide

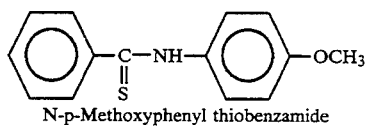
N-p-Methoxyphenyl thiobenzamide

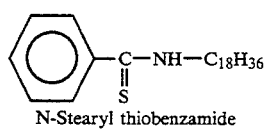
N-Stearyl thiobenzamide

The copper compound of this invention is at least one compound selected from a member consisting of a compound of the general formula (II), copper acetylacetonate, chlorophyll-copper, chlorophyllin-copper and copper hydroxide.

$$(R-X)_n Cu \qquad (II)$$

wherein R represents a hydrogen atom, an alkyl group, a cycloalkyl group, an aryl group, an aralkyl group or a heterocyclic rest (said group or rest may have at least one substituent); and X represents —COO, —SO$_4$, —SO$_3$, —PO$_4$ or —O; n represents an integer of 1 to 4.

The lead compound of this invention is at least one compound selected from a member consisting of a compound of the general formula (III), lead acetylacetonate, chlorophyll-lead, chlorophyllin-lead and lead hydroxide.

$$(R-X)_n Pb \qquad (III)$$

wherein R represents a hydrogen atom, an alkyl group, a cycloalkyl group, an aryl group, an aralkyl group or a heterocyclic rest (said group or rest may have at least one substituent); and X represents —COO, —SO$_4$, —SO$_3$, —PO$_4$ or —O; and n represents an integer of 1 to 4.

The compounds of the general formulae (II) and (III) are not particularly limited and include, for example, copper stearate, lead stearate, copper palmitate, lead palmitate, copper oleate, lead oleate, copper behenate, lead behenate, copper laurate, lead laurate, copper caprate, lead caprate, copper caproate, lead caproate, copper valerate, lead valerate, copper isolactate, lead isolactate, copper lactate, lead lactate, copper propionate, lead propionate, copper acetate, lead acetate, copper formate, lead formate, copper hydroxide, lead hydroxide, copper benzoate, lead benzoate, copper o-toluylate, lead o-toluylate, copper m-toluylate, lead m-toluylate, copper p-toluylate, lead p-toluylate, copper para-tertiary-butylbenzoate, lead para-tertiary-butylbenzoate, copper o-chlorobenzoate, lead o-chlorobenzoate, copper m-chlorobenzoate, lead m-chlorobenzoate, copper p-chlorobenzoate, lead p-chlorobenzoate, copper dichlorobenzoate, lead dichlorobenzoate, copper trichlorobenzoate, lead trichlorobenzoate, copper p-bromobenzoate, lead p-bromobenzoate, copper p-iodobenzoate, lead p-iodobenzoate, copper p-phenylbenzoate, lead p-phenylbenzoate, copper o-benzoylbenzoate, lead o-benzoylbenzoate, copper p-nitrobenzoate, lead p-nitrobenzoate, copper anthranilate, lead anthranilate, copper p-aminobenzoate, lead p-aminobenzoate, copper oxalate, lead oxalate, copper malonate, lead malonate, copper succinate, lead succinate, copper glutarate, lead glutarate, copper adipate, lead adipate, copper pimelate, lead pimelate, copper suberate, lead suberate, copper azelate, lead azelate, copper sebacinate, lead sebacinate, copper phthalate, lead phthalate, copper monoesterphthalate, lead monoesterphthalate, copper naphthenate, lead naphthenate, copper naphthalene carboxylate, lead naphthalene carboxylate, copper tartarate, lead tartarate, copper diphenylamine-2-carboxylate, lead-diphenylamine-2-carboxylate, copper 4-cyclohexyllactate, lead 4-cyclohexylactate, copper diethyldithio carbamate, lead diethyldithiocarbamate, copper gluconate, lead gluconate, diethoxy copper, diethoxy lead, di-isopropoxy copper, di-isopropoxy lead, di-n-butoxy copper, di-n-butoxy lead, copper octylate, lead octylate, copper alkylbenzene sulfonate, lead alkylbenzene sulfonate, copper p-toluene sulfonate, lead p-toluene sulfonate, copper naphthalene sulfonate, lead naphthalene sulfonate, copper naphthylamine sulfonate, lead naphthylamine sulfonate, copper n-dodecylbenzene sulfonate, lead n-dodecylbenzene sulfonate, copper dodecyl sulfate, lead dodecyl sulfate, copper 2,5-dimethylbenzene sulfonate, lead 2,5-dimethylbenzene sulfonate, copper 2-carbomethoxy-5-methylbenzene sulfonate, lead 2-carbomethoxy-5-methylbenzene sulfonate, copper α-naphthylphosphate, lead α-naphthylphosphate, copper stearylphosphate, lead stearylphosphate, copper laurylphosphate, lead laurylphosphate, copper di-2-ethylhexylphosphate, lead di-2-ethylhexylphosphate, copper isodecylphosphate, lead isodecylphosphate and the like.

One of the above thioamide compound, the copper compound and the lead compound absorb almost no rays of near IR-region, or, even if the absorption occured, slight ray of a particular wave length. The heating of one of the thioamide compound, the copper compound and the lead compound has no substantial effect on the near IR-absorbency. However, heating an admixture of the thioamide compound and the above copper compound or the above lead compound causes a near IR-absorption uniformly and strongly. In this case, a strongly near IR-absorption does not occur without heat-treatment, even using the thioamide compound of the general formula (I) together with at least one substance selected from a member consisting of a compound of the general formula (II) or (III), copper acetylacetonate, lead acetylacetonate, chlorophyll-copper, chlorophyll-lead, chlorophyllin-copper and chlorophyllin-lead.

However, the composition of this invention or a product containing this composition, under applied heat energy, has a feature that the heated part absorbs the rays of near IR-region. The heated part forms a latent image of the heated pattern since it has not a visible absorption. Accordingly, the composition of this invention can be used as an equipment detecting a heated pattern or as a recording paper under combination with the suitable color-developing method by applying the above feature.

Since the material obtained by heating a composition of this invention containing the thioamide compound and the copper compound and/or the lead compound exhibits a high absorbency in the entire near IR-region, it can be used as an equipment detecting near IR-rays, a recording equipment using laser rays of various near IR-range, and the like.

The degree of the near IR-absorbency can be adjusted by controlling a kind and a mixing ratio of the thioamide compound and the copper compound and/or the lead compound, a heated temperature, a heated time, etc.

The composition of this invention is prepared either by mixing the thioamide compound and the copper compound and/or the lead compound, or by mixing the thioamide compound, the copper compound and/or the lead compound, binder, pulp, thermoplastic resin and optionally auxiliary additives, such as dying agent, etc.

Further, the composition of this invention is prepared either by dissolving or dispersing the admixture of the thioamide compound and the copper compound and/or the lead compound, binder, dying agent, etc. in an appropriate solvent or disperse medium, or by dispersing the admixture of the thioamide compound and the copper compound and/or the lead compound in a solvent containing binder, dying agent, etc. As such composition, there are a coating material, filler, and the like. The mixing ratio, the amounts of the compounds of this invention and the amounts of other substances are determined in such a level that in the heat-treatment, the thioamide compound and the copper compound and/or the lead compound are contacted with one another in form of solid, melted liquid or a mixture of solid and melted liquid.

On the other hand, the product of this invention comprises the composition containing the thiourea composition and the copper compound and/or the lead compound, or it comprises the IR-absorbing material obtained by heating the composition.

This product is prepared by forming a mixture of the raw materials and the composition or the near IR-absorbing material, or by coating on or impregnating in the raw material the dispersed slurry of the composition or material by means of a spraying-machine, a coater or a printer.

The product of this invention is prepared in form of a film, sheet or bar by a usually known method, for example, by the sheet-forming, weaving, or heat-forming of an admixture of pulp, fiber, thermoplastic resin, ceramic, etc. and optionally by after-treating of the obtained product.

The heating method for obtaining a near IR-absorbency is not particularly limited. There may be used various heating methods, in which a reaction between a thioamide compound and a copper- or lead-compound occurs for obtaining a near IR-absorbency. Means for the heating methods include, for example, electric heaters, induction-heaters, extruders for film etc., thermal heads, semi-conductor lasers, IR-lamps and the like.

The heat-treatment is carried out under ambient atmosphere, for example, under usual atmosphere, inactive gas atmosphere, commonly under usual atmosphere.

The heating temperature used in this invention is in the range of 40°–400° C., preferably 50°–350° C. The heating time is in the range of several milli-seconds to several ten minutes. The rapid reaction and the uniform mixing owing to a superior heat-transfer by increasing a mutual contact of substances by means of the agitation, rotation and oscillation are preferable.

The mixing ratio of the thioamide compound to the copper compound and/or the lead compound is determined by the kinds of these compounds. However, it is suitable to use 0.01–50 weight-parts, preferably 0.1–10 weight-parts of the thioamide compound, based on 1 part of the copper compound and/or the lead compound.

As described above, it is preferred that the admixture of the thioamide compound and the copper compound and/or the lead compound used in this invention is an admixture of the thioamide compound of the general formula (I) and at least one compound selected from a member consisting of the copper compound of the general formula (II), copper acetylacetonate, chlorophyl-copper, chlorophyllin-copper, copper hydroxide, the lead compound of the general formula (III), lead acetylacetonate, chlorophyl-lead, chlorophyllin-lead and lead hydroxide.

The above admixture absorbs the rays of entirely near IR-region of 700–2000 nm uniformly and strongly.

The reason for this fact is not clear. As is apparent from Examples and Comparative Examples, the heating of one of the thioamide compound, the copper compound and the lead compound does not cause the entirely near IR-absorption in the region of 700–2000 nm uniformly and strongly, and the mixing of the thioamide compound and the copper compound and/or the lead compound without heating provides the same result. Accordingly, it is assumed that the heating of the admixture of this invention causes a reaction between the thioamide compound and the copper compound and/or the lead compound, thereby forming a complex.

EXAMPLES

The following examples illustrate this invention, although this invention is not limited to Examples. The parts are parts by weight.

EXAMPLE 1

Each of liquid A (containing the thioamide compound) and liquid B (containing the copper compounds shown in No. 1, 3 and 5 of Table 1) was ground to an average particle size of circa $3\mu$ by an attritor.

| Liquid A | |
|---|---|
| Thioamide compound of No. 1, 3 or 5 | 20 parts |
| 10% aqueous solution of polyvinyl alcohol | 50 parts |
| Water | 30 parts |
| Total | 100 parts |
| Liquid B | |
| Copper compound of No. 1, 3 or 5 | 20 parts |
| 10% aqueous solution of polyvinyl alcohol | 50 parts |
| Water | 30 parts |
| Total | 100 parts |

50 parts of liquid A and 50 parts liquid B were mixed to prepare a coating material. The coating material was applied on the side of a fine paper weighing 60 g/m$^2$ at a coating weight of 5 g/m$^2$ by means of a meyer-bar and then dried. In this manner, a recording paper was obtained.

Any of the recording sheets is white to pale blue and forms a pale brownish-green color in contact with a metal block having a surface temperature of 150° C. for 5 seconds.

At each colored part, the near IR-absorption values of 800, 900, 1000, 1500 and 2000 nm wave lengths are high, i.e. they are more than 80% on an average.

A thermo-sensitive printing was made by means of a thermal-sensitive bar code printer (BW-100T, manufactured by Mekano System Co., Ltd.) In any case, a pale brownish-green bar-cord pattern was obtained. This pattern is clearly readable by means of a bar-code reader (MS-Ba-Dec 230, manufactured by Mekano System Co., Ltd.) in which a semi-conductor laser having a near IR-wave length of 940 nm is used as a reading means.

EXAMPLE 2

In accordance with the Combination Nos. 1–23 in Table 1, 5 parts of a thioamide compound and 5 parts of a copper compound were charged in a porcelain tiegel to prepare an admixture.

10 parts of the admixture was heat-treated at 150° C. for 15 seconds in an electric furnace. The obtained pale-colored reaction-product (powder) was fixed in a certain thickness on a fine paper.

The reflectance of the surface was measured by a spectrophotometer (UVID EC-590, manufactured by Japan Spectroskopic Co., Ltd.), with regard to the reflexion spectrum of the near IR-region of 800–2500 nm wave length.

A near IR-absorbency is illustrated as an average near IR-absorption value, wherein the near IR-absorption value is a difference between 100% and a reflectance at each wave length of 800, 900, 1000, 1500 and 2000 nm. In this case, ⊚ indicates an average value of at least 80%, ○ indicates an average value of at least 60%, Δ indicated an average value of at least 30%, X indicates an average value of less than 30%. The near IR-absorbing material of this invention means a material having an average value of at least 30%. The average IR-absorbency of the reaction-substances in Nos. 1–23 of Table 1 indicates a value of at least 60%.

COMPARATIVE EXAMPLE 1

Each of thioamide compounds or copper compounds in Table 2 was heat-treated under the same conditions as in Example 2 to prepare a heated product.

The near IR-reflexion spectrum of the heated product was measured, and the near IR-absorbency was evaluated. All of the near IR-absorbencies are less than 30%, as seen in Table 2.

Further, the comparison of a separate heating, a mixing, and a combined heating of the thioamide compound and the copper compound used in this invention are explained in FIG. 1. In FIG. 1, N-phenylthiobenzamide is used as the thioamide compound of this invention, and copper p-chlorobenzoate is used as the copper compound of this invention, wherein Nos. 1 and 4 of Comparative Example 1 as a separate heating, No. 1 of Example 1 as a mixing, and No. 1 of Example 2 as a combined heating are compared, in regard to the near IR-reflexion spectra in the region of 800–2000 nm.

From FIG. 1, it is clear that the near IR-absorbency of Example 2, No. 1 in the combined heating of N-phenylthiobenzamide and copper p-chlorobenzoate is remarkably higher than the near IR-absorbency in heating without mixing or in mixture without heating; i.e. the near IR-absorbency of Example 2, No. 1 indicates more than 90% in the entirely measured wave lengths.

EXAMPLE 3

Each of thioamide compounds and copper compounds which were described in Nos. 24–32 of Table 3, was prepared as follows:

| Liquid A | |
|---|---|
| Thioamide compound | 50 Parts |
| 10% aqueous solution of polyvinyl alcohol | 25 parts |
| Water | 125 parts |
| Liquid B | |
| Copper compound | 50 parts |
| 10% aqueous solution of polyvinyl alcohol | 25 parts |
| Water | 125 parts |

Each Liquid of the above-mentioned composition was ground to an average particle size of 1 micron by an attritor. Then, the dispersions were mixed in the portion of Table 3 to prepare a coating material. The coating material was applied on one side of a fine paper weighing 50 g/m² at a coating weight of 3.0 g/m² and then dried. The obtained sheet was heat-treated during 5 seconds under a pressure of 10 g/m² in contact with a plate having a temperature of 150° C.

The near IR-absorbency of the obtained sheet was measured in the same manner as in Example 2. The color of background of the coated surface, the stabilities of near IR-absorbency against heat, humidity or light were measured as follows. The test results are shown in Table 3.

Test Methods

Color of Background

The reflectance of the coated surface after heat-treatment is measured by a Macbeth densitometer (RD-914, using an amber filter).

Stability Against Heat

A sheet allows to stand in oven at 60° C. for 24 hours, and then the IR-reflectance is measured by a spectrophotometer (using a wave length of 1000 nm). The stability against heat is evaluated as a residual rate of near IR-absorbency from the following equation.

$$\text{Residual rate} = \frac{100 - \text{Reflectance after heat-treatment}}{100 - \text{Reflectance before heat-treatment}} \times 100(\%)$$

Stability Against Humidity

A sheet allows to stand under the condition of 40° C. and 90% RH. After 24 hours, a near infrared reflectance of the sheet is measured by a spectrophotometer (using a wave length of 1000 nm). Stability against humidity is evaluated as a residual rate of near IR-absorbency from the following equation.

$$\text{Residual rate} = \frac{100 - \text{Reflectance after storage under the humidic condition}}{100 - \text{Reflectance before storage}} \times 100(\%)$$

Stability Against Light

A sheet is subjected to light-irradiation for 6 hours by means of a fade-o-meter (using a wave length of 1000 nm). Stability against light is evaluated as a residual rate of near IR-absorbency from the following equation.

Residual rate =

$$\frac{100 - \text{Reflectance after light irradiation}}{100 - \text{Reflectance before light irradiation}} \times 100(\%)$$

COMPARATIVE EXAMPLE 2

A dispersion A containing the thioamide compound or a dispersion B containing the copper compound used in Example 3 was coated and dried in the same manner as in Example 3, and then heat-treated. The near IR-absorbency was measured for the obtained product.

As is distinct from Table 3, a heat-treatment of an admixture of the thioamide compound and the copper compound provides an excellent near IR-absorbency, which was not decreased under heated state, humidic condition or light-exposure, and which was highly stable against the handling or the change of storage conditions.

The surface of the sheet was slightly colored, while its color is not remarkable owing to its nearly gray color.

On the contrary, the sheet manufactured by coating and drying either the thioamide compound or the copper compound exhibits no near IR-absorbency even in its heat-treatment, and hence this sheet is not tested with regard to its stability of the near IR-absorbency during the storage.

TABLE 1

| | Thioamide compound | Copper compound | Mixing ratio | Near IR-Absorbency | Heat-treatment |
|---|---|---|---|---|---|
| No. 1 | N-Phenylthiobenzamide | Copper p-chlorobenzoate | 1:1 | ⊚ | Heat-treatment |
| No. 2 | N-Cyclohexylthiobenzamide | Copper p-chlorobenzoate | 1:1 | ⊚ | Heat-treatment |
| No. 3 | N-Stearylthiobenzamide | Copper p-chlorobenzoate | 1:1 | ⊚ | Heat-treatment |
| No. 4 | Thioacetanilide | Copper p-chlorobenzoate | 1:1 | ⊚ | Heat-treatment |
| No. 5 | Thionicotinamide | Copper p-chlorobenzoate | 1:1 | ⊚ | Heat-treatment |
| No. 6 | N-Phenylthiobenzamide | Copperstearate | 1:1 | ⊚ | Heat-treatment |
| No. 7 | N-Phenylthiobenzamide | Copperbehenate | 1:1 | ⊚ | Heat-treatment |
| No. 8 | N-Phenylthiobenzamide | Copper p-nitrobenzoate | 1:1 | ⊚ | Heat-treatment |
| No. 9 | N-Phenylthiobenzamide + Thioacetanilide | Copper m-chlorobenzoate | (0.5:0.5):1 | ⊚ | Heat-treatment |
| No. 10 | N-Phenylthiobenzamide | Copper p-bromobenzoate | 1:1 | ⊚ | Heat-treatment |
| No. 11 | N-Phenylthiobenzamide | Copperbenzoate | 1:1 | ○ | Heat-treatment |
| No. 12 | N-Phenylthiobenzamide | Copper o-benzoylbenzoate | 1:1 | ○ | Heat-treatment |
| No. 13 | N-Phenylthiobenzamide | Chlorophyll-copper | 1:1 | ○ | Heat-treatment |
| No. 14 | N-Phenylthiobenzamide | Copper glukonate | 1:1 | ○ | Heat-treatment |
| No. 15 | N-Phenylthiobenzamide | Copper 4-cyclohexyllactate | 1:1 | ○ | Heat-treatment |
| No. 16 | N-Phenylthiobenzamide | Copper n-dodecylbenzolsulfonate | 1:1 | ○ | Heat-treatment |
| No. 17 | N-Phenylthiobenzamide | Copper naphthalene sulfonate | 1:1 | ○ | Heat-treatment |
| No. 18 | N-Phenylthiobenzamide | Copper α-naphthyl-phosphate | 1:1 | ○ | Heat-treatment |
| No. 19 | N-Phenylthiobenzamide | Copper stearate + Copper p-chlorobenzoate | 1:(0.5:0.5) | ○ | Heat-treatment |
| No. 20 | N-Phenylthiobenzamide | Copper stearylphosphate | 1:1 | ○ | Heat-treatment |
| No. 21 | N-Phenylthiobenzamide | Copper acetate | 1:1 | ○ | Heat-treatment |
| No. 22 | N-Phenylthiobenzamide | Copper succinate | 1:1 | ○ | Heat-treatment |
| No. 23 | N-Phenylthiobenzamide | Copper glutarate | 1:1 | ○ | Heat-treatment |

TABLE 2

| | Thioamide compound | Copper compound | Mixing ratio | Near IR-Absorbency | Heat-treatment |
|---|---|---|---|---|---|
| No. 1 | N-Phenylthiobenzamide | — | 1:0 | X | Heat-treatment |
| No. 2 | N-Cyclohexylthiobenzamide | — | 1:0 | X | Heat-treatment |
| No. 3 | N-Stearylthiobenzamide | — | 1:0 | X | Heat-treatment |
| No. 4 | — | Copper p-chlorobenzoate | 0:1 | X | Heat-treatment |
| No. 5 | — | Copper behenate | 0:1 | X | Heat-treatment |
| No. 6 | — | Copper stearate | 0:1 | X | Heat-treatment |

TABLE 3

| | Thioamide compound | Copper compound | Mixing ratio | Color of background | Near IR-Absorbency | Stability against | | |
|---|---|---|---|---|---|---|---|---|
| | | | | | | Heat | Humidity | Light |
| No. 24 | N-Phenylthiobenzamide | Copper p-chlorobenzoate | 1:1 | 0.25 | ⊚ | 97 | 95 | 98 |
| No. 25 | N-Phenylthiobenzamide | Copper p-chlorobenzoate | 0.5:1 | 0.26 | ⊚ | 96 | 95 | 97 |
| No. 26 | N-Phenylthiobenzamide | Copper p-chlorobenzoate | 1:0.5 | 0.24 | ⊚ | 95 | 92 | 94 |
| No. 27 | N-Cyclohexylthiobenzamide | Copper p-chlorobenzoate | 1:1 | 0.23 | ⊚ | 97 | 95 | 99 |
| No. 28 | N-Cyclohexylthiobenzamide | Copper p-chlorobenzoate | 0.5:1 | 0.24 | ⊚ | 96 | 96 | 98 |
| No. 29 | N-Cyclohexylthiobenzamide | Copper p-chlorobenzoate | 1:0.5 | 0.21 | ⊚ | 95 | 94 | 94 |
| No. 30 | N-Stearylthiobenzamide | Copper p-chlorobenzoate | 1:1 | 0.25 | ⊚ | 94 | 93 | 97 |
| No. 31 | N-Stearylthiobenzamide | Copper p-chlorobenzoate | 0.5:1 | 0.29 | ⊚ | 93 | 92 | 94 |
| No. 32 | N-Stearylthiobenzamide | Copper p-chlorobenzoate | 1:0.5 | 0.25 | ⊚ | 95 | 93 | 93 |
| No. 8 | N-Stearylthiobenzamide | — | 1:0 | 0.08 | X | | | |
| No. 9 | — | Copper p-chlorobenzoate | 0:1 | 0.28 | X | | | |
| No. 10 | N-Cyclohexylthiobenzamide | — | 1:0 | 0.07 | X | | | |

TABLE 3-continued

| | Thioamide compound | Copper compound | Mixing ratio | Color of background | Near IR- Absorbency | Stability against Heat | Humidity | Light |
|---|---|---|---|---|---|---|---|---|
| No. 11 | N-Stearylthiobenzamide | — | 1:0 | | 0.08 | X | | |

EXAMPLE 4

Each of liquid A (containing the thioamide compound) and liquid B (containing the lead compounds shown in No. 1, 3 and 5 of Table 4) was ground to an average particle size of circa 3μ by an attritor.

| Liquid A | |
|---|---|
| Thioamide compound of No. 1, 3 or 5 | 20 parts |
| 10% aqueous solution of polyvinyl alcohol | 50 parts |
| Water | 30 parts |
| Total | 100 parts |
| Liquid B | |
| Lead compound of No. 1, 3 or 5 | 20 parts |
| 10% aqueous solution of polyvinyl alcohol | 50 parts |
| Water | 30 parts |
| Total | 100 parts |

50 parts of liquid A and 50 parts of liquid B were mixed to prepare a coating material. The coating material was applied on the side of a fine paper weighing 60 g/m$^2$ at a coating weight of 5 g/m$^2$ by means of a meyer-bar and then dried. In this manner, a recording paper was obtained.

Any of the recording sheets is white to pale blue and forms a pale brownish-green color in contact with a metal block having a surface temperature of 150° C. for 5 seconds.

At each colored part, the near IR-absorption values of 800, 900, 1000, 1500 and 2000 nm wave lengths are high, that is, they are more than 80% on an average.

A thermo-sensitive printing was made by means of a thermal-sensitive bar code printer (BW-100T, manufactured by Mekano System Co., Ltd.) In any case, a pale brownish-green bar-cord pattern was obtained. This pattern is clearly readable by means of a bar-code reader (MS-Ba-Dec 230, manufactured by Mekano System Co., Ltd.) in which a semi-conductor laser having a near IR-wave length of 940 nm is used as a reading means.

EXAMPLE 5

In accordance with the Combination Nos. 1–23 in Table 4, 5 parts of a thioamide compound and 5 parts of a lead compound were charged in a porcelain tiegel to prepare an admixture.

10 parts of the admixture was heat-treated at 150° C. for 15 seconds in an electric furnace. The obtained pale-colored reaction-product (powder) was fixed in a certain thickness on a fine paper.

The reflectance of the surface was measured by a spectrophotometer (UVID EC-590, manufactured by Japan Spectroscopic Co., Ltd.), with regard to the reflexion spectrum of the near IR-region of 800–2500 nm wave length.

A near IR-absorbency is measured and evaluated in the same manner as in Example 2. The near IR-absorbing material of this invention means a material having an average value of at least 30%. The average IR-absorbency of the reaction-products in Nos. 1–23 of Table 4 indicates a value of at least 60%.

COMPARATIVE EXAMPLE 3

Each of thioamide compounds or lead compounds in Table 5 were heat-treated under the same conditions as in Example 5 to prepare a heated product.

The near IR-reflexion spectrum of the heated product was measured, and the near IR-absorbency was evaluated. All of the near IR-absorbencies are less than 30%, as seen in Table 5.

Further, the comparison of a separate heating, a mixing, and a combined heating of the thioamide compound and the lead compound used in this invention are explained in FIG. 2 In FIG. 2, N-phenylthiobenzamide is used as the thioamide compound of this invention, and lead p-chlorobenzoate is used as the lead compound of this invention, wherein Nos. 1 and 4 of Comparative Example 3 as a separate heating, No. 1 of Example 4 as a mixing, and No. 1 of Example 5 as a combined heating are compared, in regard to the near IR-reflexion spectra in the region of 800–2000 nm.

From FIG. 2, it is clear that the near IR-absorbency of Example 5, No. 1 in the combined heating of N-phenylthiobenzamide and lead p-chlorobenzoate is remarkably higher than the near IR-absorbency in heating without mixing or in mixture without heating; i.e. the near IR-absorbency of Example 5, No. 1 indicates more than 90% in the entirely measured wave lengths.

EXAMPLE 6

Each of thioamide compounds and lead compounds which were described in Nos. 24–32 of Table 6, was prepared as follows:

| Liquid A | |
|---|---|
| Thioamide compound | 50 parts |
| 10% aqueous solution of polyvinyl alcohol | 25 parts |
| Water | 125 parts |
| Liquid B | |
| Lead compound | 50 parts |
| 10% aqueous solution of polyvinyl alcohol | 25 parts |
| Water | 125 parts |

Each liquid of the above-mentioned composition was ground to an average particle size of 1 micron by an attritor. Then, the dispersions were mixed in the portion of Table 6 to prepare a coating material. The coating material was applied on one side of a fine paper weighing 50 g/m$^2$ at a coating weight of 3.0 g/m$^2$ and then dried.

The obtained sheet was heat-treated during 5 seconds under a pressure of 10 g/m$^2$ in contact with a plate having a temperature of 150° C.

The near IR-absorbency of the obtained sheet was measured in the same manner as in Example 2. The color of background of the coated surface, the stabilities of near IR-absorbency against heat, humidity or light were measured in the same manner as in Example 3. The test results are shown in Table 6.

COMPARATIVE EXAMPLE 4

A dispersion A containing the thioamide compound or a dispersion B containing the lead compound used in Example 6 was coated and dried in the same manner as in Example 6, and then heat-treated. The near IR-absorbency was measured for the obtained product. As is distinct from Table 6, a heat-treatment of an admixture of the thioamide compound and the lead compound provides an excellent near IR-absorbency, which was not decreased under heated state, humidic condition or light-exposure, and which was highly stable against the handling or the change of storage conditions.

The surface of the sheet was slightly colored, while its color is not remarkable, owing to its nearly gray color.

On the contrary, the sheet manufactured by coating and drying either the thioamide compound or the lead compound exhibits no near IR-absorbency even in its heat-treatment, and hence this sheet is not tested with regard to its stability of the near IR-absorbency during the storage.

TABLE 4

|  | Thioamide compound | Lead compound | Mixing ratio | Near IR-Absorbency | Heat-treatment |
| --- | --- | --- | --- | --- | --- |
| No. 1 | N-Phenylthiobenzamide | Lead p-chlorobenzoate | 1:1 | ⊙ | Heat-treatment |
| No. 2 | N-Cyclohexylthiobenzamide | Lead p-chlorobenzoate | 1:1 | ⊙ | Heat-treatment |
| No. 3 | N-Stearylthiobenzamide | Lead p-chlorobenzoate | 1:1 | ⊙ | Heat-treatment |
| No. 4 | Thioacetanilide | Lead p-chlorobenzoate | 1:1 | ⊙ | Heat-treatment |
| No. 5 | Thionicotinamide | Lead p-chlorobenzoate | 1:1 | ⊙ | Heat-treatment |
| No. 6 | N-Phenylthiobenzamide | Lead stearate | 1:1 | ⊙ | Heat-treatment |
| No. 7 | N-Phenylthibenzamide | Lead behenate | 1:1 | ⊙ | Heat-treatment |
| No. 8 | N-Phenylthiobenzamide | Lead p-nitrobenzoate | 1:1 | ⊙ | Heat-treatment |
| No. 9 | N-Phenylthiobenzamide + Thioacetanilide | Lead m-chlorobenzoate | (0.5:0.5):1 | ⊙ | Heat-treatment |
| No. 10 | N-Phenylthiobenzamide | Lead p-bromobenzoate | 1:1 | ⊙ | Heat-treatment |
| No. 11 | N-Phenylthiobenzamide | Lead benzoate | 1:1 | ○ | Heat-treatment |
| No. 12 | N-Phenylthiobenzamide | Lead o-benzylbenzoate | 1:1 | ○ | Heat-treatment |
| No. 13 | N-Phenylthiobenzamide | Chlorophyll-Lead | 1:1 | ○ | Heat-treatment |
| No. 14 | N-Phenylthiobenzamide | Lead glukonate | 1:1 | ○ | Heat-treatment |
| No. 15 | N-Phenylthiobenzamide | Lead 4-cyclohexyllactate | 1:1 | ○ | Heat-treatment |
| No. 16 | N-Phenylthiobenzamide | Lead n-dodecylbenzol-sulfonate | 1:1 | ○ | Heat-treatment |
| No. 17 | N-Phenylthiobenzamide | Lead napthalene sulfonate | 1:1 | ○ | Heat-treatment |
| No. 18 | N-Phenylthiobenzamide | Lead α-naphthyl-phosphate | 1:1 | ○ | Heat-treatment |
| No. 19 | N-Phenylthiobenzamide | Lead stearate + Lead p-chlorobenzoate | 1:(0.5:0.5) | ○ | Heat-treatment |
| No. 20 | N-Phenylthiobenzamide | Lead stearylphosphate | 1:1 | ○ | Heat-treatment |
| No. 21 | N-Phenylthiobenzamide | Lead acetate | 1:1 | ○ | Heat-treatment |
| No. 22 | N-Phenylthiobenzamide | Leas succinate | 1:1 | ○ | Heat-treatment |
| No. 23 | N-Phenylthiobenzamide | Lead glutarate | 1:1 | ○ | Heat-treatment |

TABLE 5

|  | Thioamide compound | Lead compound | Mixing ratio | Near IR-Absorbency | Heat-treatment |
| --- | --- | --- | --- | --- | --- |
| No. 1 | N-Phenylthiobenzamide | — | 1:0 | X | Heat-treatment |
| No. 2 | N-Cyclohexylthiobenzamide | — | 1:0 | X | Heat-treatment |
| No. 3 | N-Stearylthiobenzamide | — | 1:0 | X | Heat-treatment |
| No. 4 | — | Lead p-chlorobenzoate | 0:1 | X | Heat-treatment |
| No. 5 | — | Lead behenate | 0:1 | X | Heat-treatment |
| No. 6 | — | Lead stearate | 0:1 | X | Heat-treatment |

TABLE 6

|  | Thioamide compound | Lead compound | Mixing ratio | Color of background | Near IR-Absorbency | Stability against Heat | Humidity | Light |
| --- | --- | --- | --- | --- | --- | --- | --- | --- |
| No. 24 | N-Phenylthiobenzamide | Lead p-chlorobenzoate | 1:1 | 0.27 | ⊙ | 96 | 96 | 99 |
| No. 25 | N-Phenylthiobenzamide | Lead p-chlorobenzoate | 0.5:1 | 0.27 | ⊙ | 95 | 95 | 98 |
| No. 26 | N-Phenylthiobenzamide | Lead p-chlorobenzoate | 1:0.5 | 0.27 | ⊙ | 94 | 92 | 94 |
| No. 27 | N-Cyclohexylthiobenzamide | Lead p-chlorobenzoate | 1:1 | 0.28 | ⊙ | 97 | 94 | 98 |
| No. 28 | N-Cyclohexylthiobenzamide | Lead p-chlorobenzoate | 0.5:1 | 0.26 | ⊙ | 95 | 95 | 97 |
| No. 29 | N-Cyclohexylthiobenzamide | Lead p-chlorobenzoate | 1:0.5 | 0.27 | ⊙ | 94 | 93 | 94 |
| No. 30 | N-Stearylthiobenzamide | Lead p-chlorobenzoate | 1:1 | 0.28 | ⊙ | 95 | 93 | 96 |
| No. 31 | N-Stearylthiobenzamide | Lead p-chlorobenzoate | 0.5:1 | 0.29 | ⊙ | 92 | 92 | 93 |
| No. 32 | N-Stearylthiobenzamide | Lead p-chlorobenzoate | 1:0.5 | 0.26 | ⊙ | 94 | 93 | 92 |
| No. 8 | N-Stearylthiobenzamide | — | 1:0 | 0.09 | X |  |  |  |
| No. 9 | — | Lead p-chlorobenzoate | 0:1 | 0.29 | X |  |  |  |
| No. 10 | N-Cyclohexylthiobenzamide | — | 1:0 | 0.08 | X |  |  |  |
| No. 11 | N-Stearylthiobenzamide | — | 1:0 | 0.08 | X |  |  |  |

The near IR-absorbing composition of this invention and the sheet containing this composition are colorless, wherein the heated part has a near IR-absorbency immediately.

And each of the heat-treatment of this composition, the heat-treatment of the sheet containing this composition and the sheet containing this heat-treated composition provides a strong absorbency of the entire near IR-region of 800–2000 nm. Owing to the excellent near IR-absorbency, the materials or the products prepared by this invention are used as equipments detecting thermal lapse; optical materials such as a near IR-cut filter; recording materials; shielding materials for thermic rays; regenerative materials; sensors detecting near IR-rays and the like.

The composition of this invention or the material obtained by heat-treating this composition is slightly colored inspire of the presence of metal. Accordingly, this composition or this material has a superior appearance.

Each absorbency of the near IR-absorbing composition of this invention, the near IR-absorbing material of this invention and the product containing this material exhibits a superior stability against the change of environment conditions in the lapse of time.

Further, the near IR-absorbing composition of this invention can be easily prepared by a mixing, and the near IR-absorbing material of this invention can be easily prepared by a mixing and heating. The product of this invention containing the above composition or material may be prepared without the new equipments. Consequently, this invention is applicable for an industrial production.

We claim:

1. A near IR-absorbing composition stable at room temperature obtained by heating to a temperature of from about 40° to 400° C. a mixture comprising at least one thioamide compound having the formula:

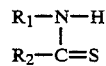

wherein $R_1$ and $R_2$ are the same or different, and represent a hydrogen atom, an alkyl group, a cycloalkyl group, an aryl group, an aralkyl group, an alkenyl group, a monovalent group selected from the group consisting of penta and hexa heterocyclic rests, or $R_2$ represents an alkoxy; in addition, each group may have a substituent selected from the group consisting of chlorine, together with the nitrogen and carbon atoms to which they are attached may form a ring containing four carbon atoms, and at least one compound having the formula:

$(R-X)_nM$ wherein R represents a hydrogen atom, an alkyl group, a cycloalkyl group, an aryl group, an aralkyl group or a heterocyclic rest (where said group or rest may have at least one substituent selected from the group consisting of alkyl, chlorine, bromine, iodine, phenyl, benzoyl, nitro and amino), and X represents —COO, —SO$_4$, —SO$_3$, —PO$^4$ or —O, and n represents an integer of 1 to 4, and M is Cu or Pb;

wherein, in said heating, said at least one thioamide compound and said at least one copper compound and/or said at least one lead compound are contacted with one another in the form of solid, melted liquid or a mixture of solid and melted liquid.

2. A near IR-absorbing composition comprising both at least one thioamide compound having the formula

wherein $R_1$ and $R_2$ are the same or different, and represent a hydrogen atom, an alkyl group, a cycloalkyl group, an aryl group, an aralkyl group, an alkenyl group, a monovalent group selected from the group consisting of penta and hexa heterocyclic rests, or $R_2$ represents an alkoxy group; in addition, each group may have a substituent selected from the group consisting of chlorine, bromine, amino, nitro, hydroxyl and methoxy, and $R_1$ and $R_2$ taken together with the nitrogen and carbon atoms to which they are attached may form a ring containing four carbon atoms, and at least one compound selected from the group consisting of a copper compound and a lead compound, said copper compound being selected from the group consisting of chlorophyll-copper, chlorophyllin-copper and copper hydroxide, said lead compound having the formula:

$(R-X)_nPb$ wherein R represents a hydrogen atom, an alkyl group, a cycloalkyl group, an aryl group, an aralkyl group or a heterocyclic rest (where said group or rest may have at least one substituent selected from the group consisting of alkyl, chlorine, bromine, iodine, phenyl, benzoyl, nitro and amino), and X represents —COO, —SO$_4$, —SO$_3$, —PO$_4$ or —O, and n represents an integer of 1 to 4.

3. A heat-activated near IR-absorbing composition having a near IR absorption of at least 60%, said near IR absorption being an average near IR absorption value, said near IR absorption value being a difference between 100% and a reflectance of said composition at each wave length of 800, 900, 1000, 1500 and 2000 nm, as measured by a spectrophotometer with regard to the reflection spectrum of said composition in the near IR region of 800-2500 nm wave length, comprising at least one thioamide compound having the formula

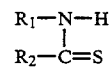

wherein $R_1$ and $R_2$ are the same or different, and represent a hydrogen atom, an alkyl group, a cycloalkyl group, an aryl group, an aralkyl group, an alkenyl group, a monovalent group selected from the group consisting of penta and hexa heterocyclic rests, or $R_2$ represents an alkoxy group; in addition, each group may have a substituent selected from the group consisting of chlorine, bromine, amino, nitro, hydroxyl and methoxy, and $R_1$ and $R_2$ taken together with the nitrogen and carbon atoms to which they are attached may form a ring containing four carbon atoms, and at least one compound selected from the group consisting of a copper compound and a lead compound, said compound having the formula:

$(R-X)_nM$ wherein R represents a hydrogen atom, an alkyl group, a cycloalkyl group, an aryl group, an aralkyl group or a heterocyclic rest (wherein said group or rest may have at least one substituent selected from the group consisting of alkyl, chlorine, bromine, iodine, phenyl, benzoyl, nitro and amino), and X represents —COO, —S$_4$, —SO$_3$, —PO$_4$ or —O, M represents Cu or Pb, and n represents an integer of 1 to 4.

* * * * *